US00RE42357E

(19) United States
(12) Reissued Patent
Malaure et al.

(10) Patent Number: US RE42,357 E
(45) Date of Reissued Patent: May 10, 2011

(54) INTERACTIVE APPLICATIONS

(75) Inventors: Jason R. Malaure, Deal (GB); Richard A. Kydd, Twickenham (GB)

(73) Assignee: ZH Interactive Systems LLC, Wilmington, DE (US)

(21) Appl. No.: 12/168,724

(22) Filed: Jul. 7, 2008 (Under 37 CFR 1.47)

Related U.S. Patent Documents

Reissue of:
(64) Patent No.: 7,073,190
Issued: Jul. 4, 2006
Appl. No.: 09/563,542
Filed: May 1, 2000

(30) Foreign Application Priority Data

May 4, 1999 (EP) ..... 99303495

(51) Int. Cl.
*H04N 5/445* (2006.01)
*G06F 3/00* (2006.01)
*H04B 1/04* (2006.01)

(52) U.S. Cl. ..... 725/61; 725/133; 725/141; 455/410; 455/411

(58) Field of Classification Search ..... 725/60, 725/61, 114, 120, 133, 141, 153; 455/410, 455/411; 380/211, 218
See application file for complete search history.

(56) References Cited

U.S. PATENT DOCUMENTS 4,337,463 A 6/1982 Vangen
4,807,259 A 2/1989 Yamanaka et al.
5,247,440 A 9/1993 Capurka et al.
5,327,468 A 7/1994 Edblad et al.
5,345,595 A 9/1994 Johnson et al.
5,408,506 A 4/1995 Mincher et al.
5,416,808 A 5/1995 Witsaman et al.
5,519,433 A 5/1996 Lappington et al.
5,537,143 A 7/1996 Steingold et al.
5,695,400 A * 12/1997 Fennell et al. ..... 463/42
5,748,941 A 5/1998 Rabjohns
5,764,275 A 6/1998 Lappington et al.
5,850,447 A 12/1998 Peyret
5,936,661 A 8/1999 Trew
6,320,507 B1 11/2001 Strzelec et al.
6,415,325 B1 7/2002 Morrien
6,449,291 B1 9/2002 Burns et al.
6,452,541 B1 9/2002 Zhao et al.
6,483,825 B2 11/2002 Seta
6,798,790 B1 9/2004 Enssle et al.
7,073,190 B1 7/2006 Malaure et al.

FOREIGN PATENT DOCUMENTS

WO WO 95/15653 6/1995
WO WO-9515653 A1 6/1995
WO WO 9515653 A1 * 6/1995

* cited by examiner

*Primary Examiner* — John W Miller
*Assistant Examiner* — John Schnurr

(57) ABSTRACT

An interactive broadcast system comprising a plurality of user interfaces each comprising a local clock signal generator. Each user interface delivers interactive applications to a respective user with reference to its respective local clock signal. A central control system broadcasts data to the user interfaces. The CCS detects adjustment of the local clock signals to identify fraudulent users.

9 Claims, 2 Drawing Sheets

INTERACTIVE APPLICATIONS

Matter enclosed in heavy brackets [ ] appears in the original patent but forms no part of this reissue specification; matter printed in italics indicates the additions made by reissue.

*CROSS-REFERENCES TO RELATED APPLICATIONS*

*This patent application is a reissue application for commonly owned U.S. Pat. No. 7,073,190, which issued from U.S. patent application Ser. No. 09/563,542, filed on May 1, 2000, and is incorporated herein in its entirety by reference.*

FIELD OF THE INVENTION

The present invention relates to a method and apparatus for broadcasting interactive applications to a plurality of users via respective user interfaces.

DESCRIPTION OF PRIOR ART

In conventional interactive broadcast systems, data is broadcast to a plurality of user interfaces (e.g. televisions with set-top boxes) from a central control, e.g. computer, system (CCS). In order to deliver timed applications it is necessary to provide a local clock generator with each user interface. The user interface can then deliver the interactive application with reference to the signal from the local clock generator. The local clock generator is then synchronised with a central clock at the CCS to ensure that the interactive application is performed simultaneously at all user interfaces. However, since this means that the local clock must be adjustable, it is possible for the clock adjustment to be used in a fraudulent way. For instance a user can receive a quiz game on two user interfaces, one where he has deliberately adjusted the local clock and the other not. The user can then view the answers on the one user interface and enter the correct answers on the other user interface before it becomes locked out.

Previous proposals for detecting fraud are described in U.S. Pat. No. 5,850,447 and WO-A-95/15653. In these cases, the local user interfaces detect fraud and notify the CCS. This itself can be compromised locally in some cases.

SUMMARY OF THE INVENTION

In accordance with one aspect of the present invention there is provided an interactive broadcast system comprising a plurality of user interfaces each comprising a local clock signal generator. wherein each user interface delivers interactive applications to a respective user with reference to its respective local clock signal; and a central control system (CCS) for broadcasting data to the user interfaces and for receiving data from the user interfaces, the CCS being adapted to identify fraudulent users by comparing the time at which certain data is returned from a plurality of the user interfaces.

In accordance with a second aspect of the present invention there is provided a method of detecting fraudulent users in an interactive broadcast system, the method comprising (1) broadcasting data to a plurality of user interfaces from a central control system (CCS);

(2) generating a local clock signal at each user interface;

(3) delivering an interactive application to a respective user from each user interface with reference to its respective local clock signal;

(4) receiving data at the CCS from the local interfaces; and, (5) identifying fraudulent users by comparing the time at which certain data is returned from a plurality of the local interfaces.

In contrast to the previous proposals, the CCS detects fraudulent use by comparing the time of receipt of data from a plurality of user interfaces. It is thus not dependent on data received from a single interface.

In one method, step (4) comprises first sending a return path request to the user interfaces, step (5) comprising monitoring the time of receipt of return path data generated by the user interfaces in response to the return path request to identify user interfaces which have sent return path data which is advanced or delayed by more than a predetermined threshold. For example, the return path request may cause the user interfaces to return a local score at the end of an interactive application as determined by the user interface.

In another method, the local interfaces could be automatically controlled to return certain data, e.g. a score, at the end of an interactive game or at some other predetermined game time and not directly in response to a request from the CCS. However, the CCS will know when this return data is expected and can make the necessary comparisons.

The user interfaces may utilise their respective local clock signals in a number of ways. In a first example an application start signal is broadcast to the user interfaces by the CCS. The user interfaces calculate an application time local clock signal with reference to the application start signal. Each user interface can then deliver the interactive application with reference to its respective application time local clock signal. In a second example a central clock signal is periodically broadcast to the user interfaces representing a central time. The user interfaces can then calculate an offset signal with reference to the central clock signal and a respective local clock signal. The offset signal can then be used by the user interfaces at any time to determine the central time from their local clock signal. This can conveniently be implemented as part of a repetitive broadcast as described in U.S. patent application Ser. No. 09/419,332 incorporated herein by reference.

The interactive application may take a variety of different forms—for instance it may comprise a video game which is played simultaneously by a number of remote users, or a quiz game played simultaneously by a number of remote users. The application may be broadcast in conjunction with a live TV event. For instance the application may enable the user to take part in a live TV quiz, or predict the occurrence of certain events in a live sporting event.

BRIEF DESCRIPTION OF THE DRAWINGS

An example of the present invention will now be described with reference to the accompanying drawings, in which.

DETAILED DESCRIPTION OF THE EMBODIMENT

Figure 1:
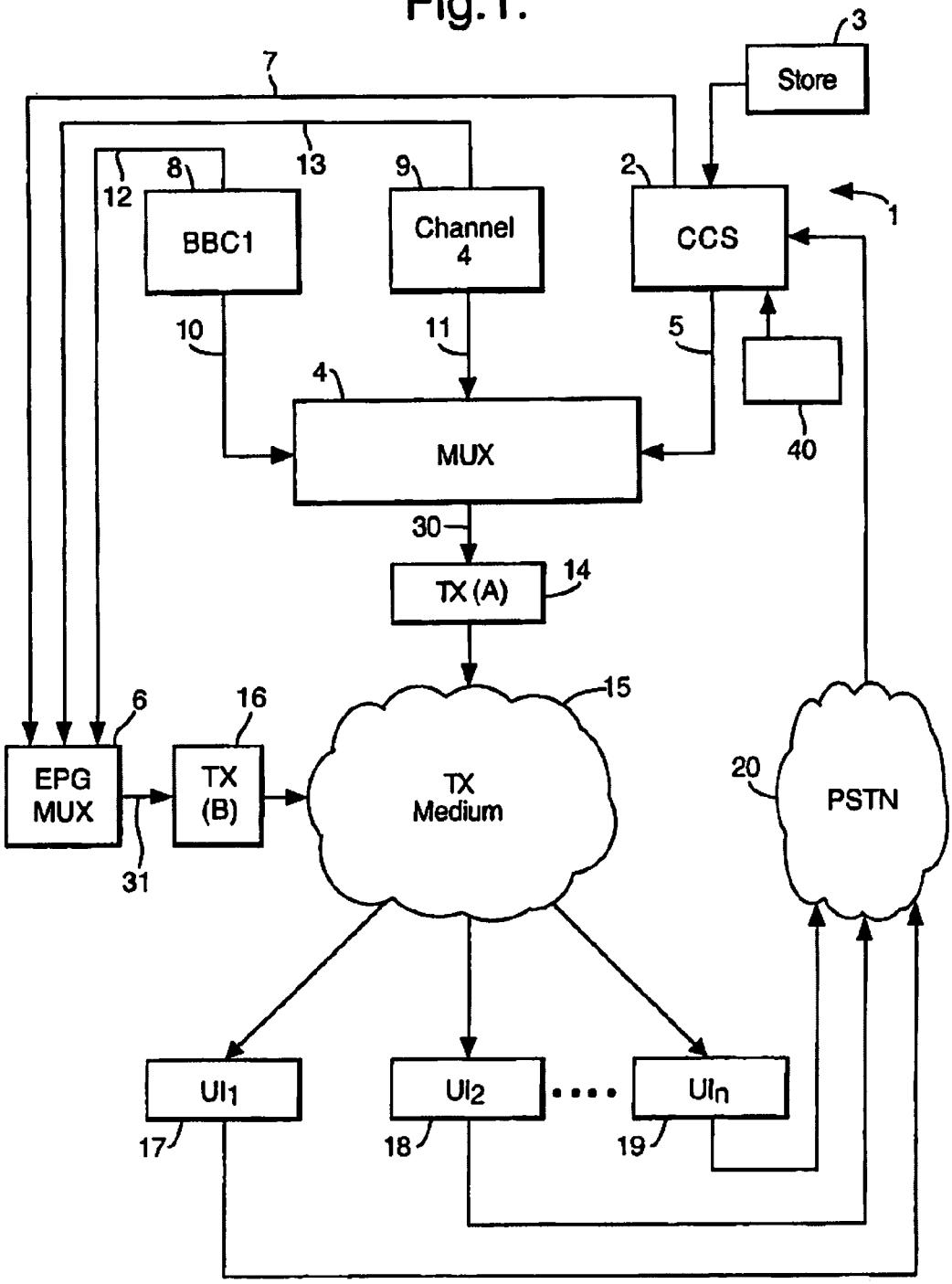
FIG. 1 is a schematic diagram of a digital broadcast network.

The digital broadcast network shown in FIG. 1 comprises an interactive game control system 1 including a central control, in this case computer, system 2; an application data store 3 and a CCS clock 40. The application data store 3 contains setup data and real time data which can be accessed and amended by the CCS 2. The setup data may comprise executable program files, bitmaps, sound samples, video clips, and other multimedia and data resources. The real time data comprises data which is broadcast after the scheduled start time (eg question/answer data for a quiz game application). The setup data and real time data is fed at an appropriate time to a broadcast headend multiplexer 4 via a data feed 5. The CCS also generates electronic programme guide (EPG) data which is fed to an EPG multiplexer 6 via EPG data feed 7. Each item of EPG data includes a programme identifier (PID) and a system information (SI) table containing EPG information relating to that PID (eg. name, scheduled start time, splash screen data etc).

Broadcast TV stations 8 (BBC1) and 9 (Channel 4) each generate digital audio and video signals which are fed to the broadcast headend multiplexer 4 via respective data feeds 10,11. The data feeds 5,10,11 may be via dedicated cables or via broadcast on the air or any other suitable medium.

The broadcast TV stations 8,9 also generate EPG data which is fed to the EPG multiplexer 6 via respective data feeds 12,13. The EPG data may contain the programme name, broadcast TV station name and any other programme related information.

The broadcast headend multiplexer 4 multiplexes the digital data from the data feeds 5,10,11 and outputs the data serially to a transmitter 14 as an MPEG-II transport stream 30.

Similarly the EPG multiplexer 6 multiplexes the digital data from the EPG data feeds 7,12,13 and outputs the data serially to a transmitter 16 as an MPEG-II transport stream 31.

The transmitters 14,16 then transmit the data over a transmission medium 15. This may be a digital or analog television broadcast system, terrestrial or satellite, or cable, or the Internet, or the like.

A number of user interfaces (UIs) 17,18,19 etc. receive data from the transmission medium 15. The UIs can also send data to the CCS 2 via the public-switched-telephone-network (PSTN) 20 or other return path means (not shown) such as a cable-modem, or even via the transmission medium 15.

Figure 2:
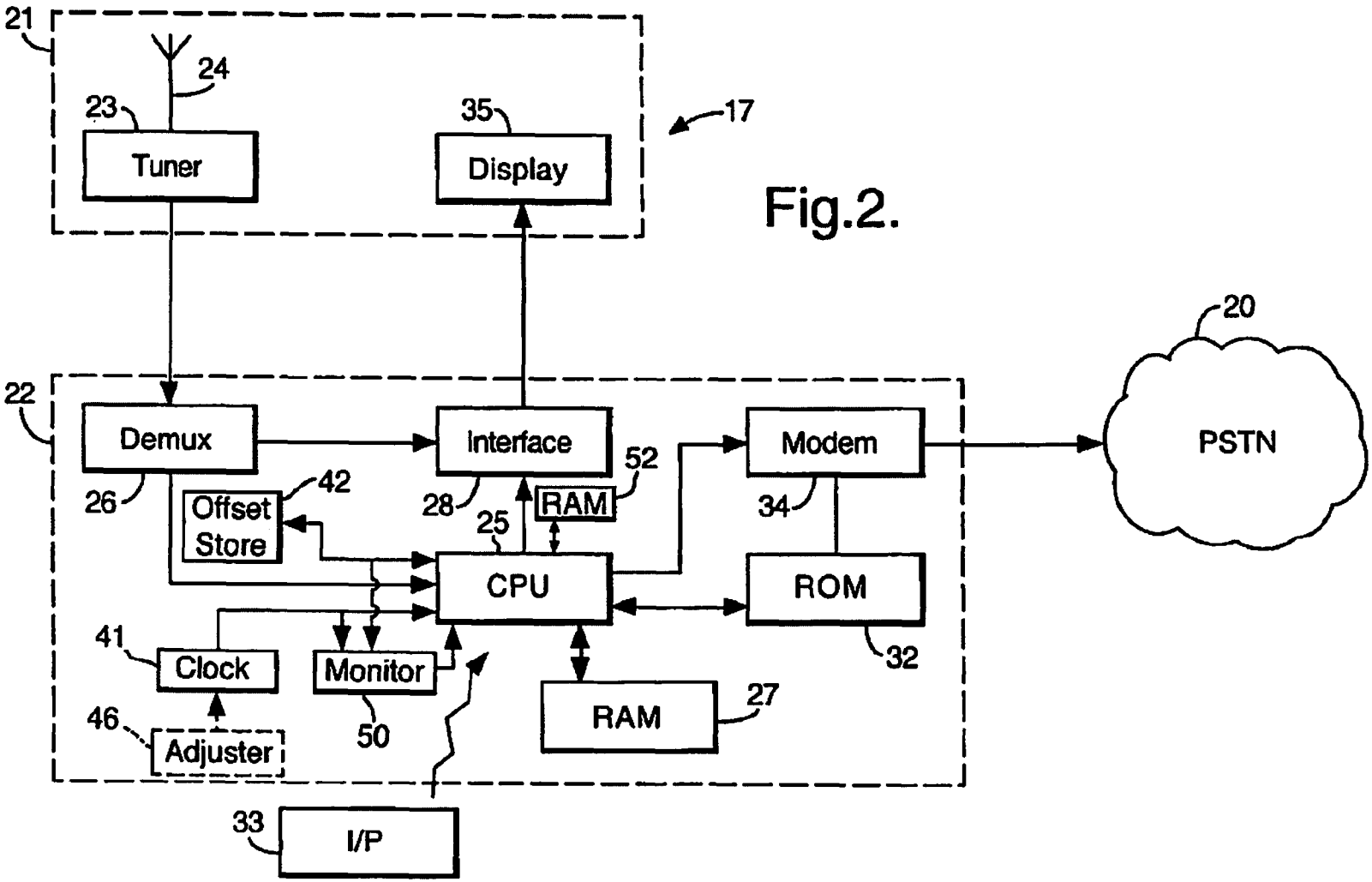
FIG. 2 is a schematic diagram of a user interface.

One of the user interfaces 17 is shown in detail in FIG. 2. The UI comprises a conventional television set 21, a set-top box 22 and one or more input devices 33. The television set 21 comprises a cathode ray tube (CRT) 35 and a tuner 23 coupled to an aerial 24. The tuner 23 is selectively tuned by a central processing unit (CPU) 25 to receive data from the transmission medium 15. Data is passed to a demultiplexer 26 which demultiplexes the MPEG-II transport stream. Setup data and real time data is fed to the CPU 25 and video/audio data is fed to a display interface 28.

The CPU 25 accesses a random access memory (RAM) 27 and a read only memory (ROM) 32 to compile a display signal which is passed to the display interface 28 and merged with the audio/video signal from the demultiplexer 26. An input device 33 provides input to the CPU 25 from a user. An STB clock 41 feeds an STB clock signal to the CPU 25. Return path data is returned to the CCS 2 by the CPU 25 via a modem 34 and the PSTN 20.

An example of an interactive quiz game application will now be described.

Ten minutes before the scheduled start time of the quiz game, the CCS 2 downloads setup data relating to the application from the application data store 3, and feeds it to the broadcast headend multiplexer 4. The multiplexer 4 then places the data on a broadcast carousel whereby it repeatedly transmits the setup data on the transport stream 30 as described in more detail in U.S. patent application Ser. No. 09/419,332.

The user interfaces can then download the setup data by switching the tuner 23 to receive data from the transport stream 30. Setup data with the required PID is downloaded by CPU 25 and saved in the RAM 27. Once all of the setup data has been downloaded (or sufficient components of it to allow execution to commence) timed execution of the scheduled interactive application can commence.

At the scheduled start time, the CCS 2 generates real time question data which is broadcast to the user interfaces. At the same time the CPU 25 automatically enters a game mode in which the user is presented with a series of questions based on the received question data. The user provides answers by selecting answer icons using the input device 33. At a set time following display of a question, the user is "locked but" (i.e. is prevented from entering an answer to the question) by the CPU 25 and the answer is displayed on the CRT 35. If the CPU 25 determines that the user has answered correctly, then a score is awarded and stored locally.

The questions and answers may fill the entire CRT screen. Alternatively the questions and answers may be overlaid on a real-time television broadcast of a presenter reading out the questions to competitors in a television studio, for example originating from the Channel 4 broadcast TV station 9.

At the end of the game, the CPU 25 transmits the user's score to the CCS 2 via the modem 34 and PSTN 20.

Each user has an account with a number of cash credits which are stored and managed by the CCS 2. On receipt of scores from a number of user interfaces the CCS 2 compares the scores and issues prizes to the users with the highest scores by adding cash credits to their accounts. This use of credits or tokens is described in more detail in EP-A-0858225.

The way in which the system of FIGS. 1 and 2 handles time will now be described. The CCS clock 40 constantly generates a central clock signal CCS CLOCK. The STB clock 41 constantly generates a local clock signal STB CLOCK. In general STB CLOCK will be offset from CCS CLOCK and from the STB CLOCK signals of the other user interfaces 18,19 etc. In order to account for this lack of clock synchronisation, the CCS clock is periodically transmitted by the CCS 2 to the user interfaces 17-19 etc. Each CPU 25 can then calculate an offset value which is stored in a RAM 42:

OFFSET–CCS CLOCK–STB CLOCK.

This enables the CPU 25 to calculate CCS CLOCK at any time as:

CCS CLOCK–STB CLOCK+OFFSET.

Before, at or even after the start of the quiz game, the CCS 2 transmits a game start clock signal CCS CLOCK (game start) to the user interfaces defining the time according to the CCS at which the game starts. The CPU 25 in each STB can then calculate the STB game start time as:

STB CLOCK (game start)·CCS CLOCK (game start)–OFFSET.

During the quiz game, the CCS 2 retrieves question and answer data from the store 3 and places the data on the transport stream 30 before it is to be displayed by the user interfaces. Each item of data contains question/answer data, and also a relative game time (i.e. a time from the start of the game) at which the data is to be displayed. For instance the following sequence of data may be broadcast during a quiz game:

| Data | Relative Game Time |
|---|---|
| Question A | 60 seconds-70 seconds |
| Answer A | 70 seconds-75 seconds |
| Question B | 75 seconds-85 seconds |
| Answer B | 85 seconds-90 seconds |

Thus Question A is placed on the transport stream prior to 60 seconds from game start, and is displayed from 60-70 seconds from game start. During that 10 second period the user inputs his answer. At 70 seconds the user interface is locked out and the answer to question A is displayed for the next 5 seconds.

The CPU 25 handles the relative game time messages in the following way. The data and relative game time is input to the CPU 25. The CPU 25 then calculates the STB CLOCK time corresponding with the relative game time as:

STB CLOCK (relative)−STB CLOCK (game start)+ relative game time.

Thus the CPU displays Answer A between STB CLOCK (70 seconds) and STB CLOCK (75 seconds).

A fraudulent user can take advantage of this system as follows. This fraudulent user inserts an adjustment module 46 (shown in dotted lines in FIG. 2) to adjust the signal STB CLOCK from the STB clock 41. This could either set STB CLOCK forward or backward by a fixed amount, or could slow down or speed up the rate of STB CLOCK. The adjustment module 46 is enabled by the user after STB CLOCK (game start) has been calculated. As a result the display of any subsequent question or answer data is delayed or advanced when compared to other STBs. By running two user interfaces (one with STB CLOCK adjusted, the other not) the fraudulent user can view the answers on one user interface and enter the correct answers on another user interface before it becomes locked out by the CPU 25 since that CPU 25 will not have reached the relative game time at which lock out occurs.

This fraudulent clock adjustment is detected in one or more of a number of ways as discussed below.

1. Return Path Request

At some point after the game start (either during or after the game) the CCS 2 sends a return path request to the user interfaces, asking them to send an acknowledgment back to the CCS 2 at a certain relative game time. If the acknowledgment from one of the user interfaces is delayed or advanced (when compared to the return time of acknowledgements from the other user interfaces) by more than a predetermined threshold then it is likely that STB CLOCK on that user interface has been adjusted. Therefore that user interface is identified and no prize is issued to the fraudulent user registered with the identified user interface.

2. Return Path Scores

The user interfaces are requested to send their scores back to the CCS 2 at the end of the quiz game. If the return time of the score from one of the user interfaces is delayed or advanced (when compared to the return time of scores from the other user interfaces) by more than a predetermined threshold, then that user interface is identified as a fraudulent interface, and no prize is issued to the user registered with the fraudulent interface.

Optionally, the following method may also be employed.

3. STB CLOCK Monitor

A monitor 50 is provided to monitor STB CLOCK and OFFSET. This could be a separate module or part of the CPU 25. If either of these signals is adjusted then the monitor 50 sends a detection signal to the CPU 25 which informs the CCS 2 with an identification message. Thus if the user either adjusts STB CLOCK immediately after STB (game start) has been calculated; or resets STB CLOCK at the end of the game to attempt to disguise their fraud, then this adjustment will be detected by the monitor 50.

We claim:

1. An interactive broadcast system comprising:

a plurality of user interfaces each having a local clock signal generator, wherein each user interface delivers interactive applications to a respective user with reference to its respective local clock signal;

a central control system (CCS) for broadcasting data to the user interfaces and for receiving data from the user interfaces, the CCS being adapted to identify fraudulent adjustment of one of the local clock signals by comparing the time of receipt by the CCS of certain data sent by one of the user interfaces with the time of receipt of data from another different one of the user interfaces;

means for periodically broadcasting a central clock signal to the user interfaces; and each user interface having means for calculating an offset signal with reference to the central clock signal and its respective local clock signal so as to enable obtaining the central clock signal from the local clock signal.

2. A system according to claim 1, wherein each user interface comprises a monitor for detecting adjustment of the local clock signal.

3. A system according to claim 1, wherein the CCS is adapted to send a return path request to the user interfaces and to monitor the time of receipt of corresponding return path data generated by the user interfaces in response to the return path receipt to identify user interfaces which have sent return path data which is advanced or delayed by more than a predetermined threshold.

4. A system according to claim 1, wherein the return path request causes the user interfaces to return a local score at the end of an interactive application as determined by the user interface.

5. A system according to claim 1, wherein the CCS is adapted to broadcast an application start signal to the user interfaces, wherein each user interface comprises means for calculating an application time local clock signal with reference to the application start signal, and wherein each user interface delivers interactive applications to a respective user with reference to its respective application time local clock signal.

6. A method of detecting fraudulent users in an interactive broadcast system, the method comprising:

(1) broadcasting data to a plurality of user interfaces from a central control system (CCS);

(2) generating a local clock signal at each user interface;

(3) delivering an interactive application to a respective user from each user interface with reference to its respective clock signal;

(4) receiving data at the CCS from the [local] *user* interfaces;

(5) identifying fraudulent adjustment of one of the local clock signals by comparing the time of receipt by the CCS of certain data sent by one of the user interfaces with the time of receipt of data from another different one of the user interfaces;

(6) periodically broadcasting a central clock signal to the user interfaces; and (7) calculating at the user interface an offset signal with reference to the central clock signal and a respective local clock signal so as to enable obtaining the central clock signal from the local clock signal.

7. A method according to claim 6, wherein step (4) comprises first sending a return path request to the user interfaces; and step (5) comprises monitoring the time of receipt of return path data generated by the user interfaces in response to the return path request to identify user interfaces which have sent return path data which is advanced or delayed by more than a predetermined threshold.

8. A method according to claim 6 wherein the return path request causes the user interfaces to return a local score at the end of an interactive application as determined by the user interface.

9. A method according to claim 6, further comprising (8) broadcasting an application start signal to the user interfaces; and (9) calculating an application time local clock signal with reference to the application start signal, wherein each user interface delivers interactive applications to a respective user with reference to its respective application time local clock signal.

[10. A method of detecting fraudulent users in an interactive broadcast system, the method comprising:

(1) broadcasting data to a plurality of user interfaces from a central control system (CCS);

(2) generating a local clock signal at each user interface;

(3) delivering an interactive application to a respective user from each user interface with reference to its respective local clock signal;

(4) receiving data at the CCS for the local interface;

(5) identifying fraudulent adjustment of one of the local clock signals by comparing the time of receipt by the CCS of certain data sent by one of the user interfaces with the time of receipt of data from another different one of the user interfaces;

(6) periodically broadcasting a central clock signal to the user interfaces; and (7) calculating an offset signal at the user interface with reference to the central clock signal and a respective local clock signal so as to enable obtaining the central clock signal from the local clock signal.]

* * * * *

UNITED STATES PATENT AND TRADEMARK OFFICE

CERTIFICATE OF CORRECTION

PATENT NO. : RE42,357 E
APPLICATION NO. : 12/168724
DATED : May 10, 2011
INVENTOR(S) : Malaure et al.

It is certified that error appears in the above-identified patent and that said Letters Patent is hereby corrected as shown below:

Column 7, line 15, in Claim 9, delete “comprising” and insert -- comprising: --.

Signed and Sealed this
Twentieth Day of September, 2011

David J. Kappos

David J. Kappos
*Director of the United States Patent and Trademark Office*